United States Patent [19]
Schroeder

[11] Patent Number: 4,464,049
[45] Date of Patent: Aug. 7, 1984

[54] ILLUMINATION FLICKER METER
[75] Inventor: Eugene R. Schroeder, Royal Oak, Mich.
[73] Assignee: Westinghouse Electric Corp., Pittsburgh, Pa.
[21] Appl. No.: 337,789
[22] Filed: Jan. 7, 1982
[51] Int. Cl.³ .............................................. G01J 1/42
[52] U.S. Cl. .............................. 356/218; 250/214 RC; 328/167; 356/226
[58] Field of Search ....................... 356/217, 218, 226; 250/554, 214 RC; 307/351; 328/115, 150, 165, 167; 340/555, 578, 600

[56] References Cited
U.S. PATENT DOCUMENTS
3,742,474  6/1973  Muller .................................. 340/578
4,220,412  9/1980  Shroyer et al. ................. 356/226 X
4,249,168  2/1981  Muggli .................................. 340/578

OTHER PUBLICATIONS
Wait et al., "Intro to Operational Amplifier Theory and Applications", McGraw-Hill Book Co., pp. 159–163, 1975.

Primary Examiner—Vincent P. McGraw
Assistant Examiner—L. A. Dietert
Attorney, Agent, or Firm—M. J. Moran

[57] ABSTRACT

An illumination flicker measuring device having a photodiode detector producing a signal proportional to the illumination being measured. An input amplifier for increasing the level of the signal produced by the photodiode detector. A capacitor is inserted so as remove the average light output component of the signal produced by the photodiode detector and which is then entered into a rectifier and amplifier so as to remove the lower envelope of the signal and amplify the upper envelope of the signal. A low pass filter is then attached to the rectifier and amplifier so as to remove the 120 Hz ripple produced by the 60 Hz system powering the illumination system. The output of the low pass filter is then passed through a capacitor to remove DC components present and then rectified and amplified again to produce a signal which is proportional to the amplitude of the flicker present in the illumination system. A capacitor and amplifier are then inserted so as to peak detect the flicker and multiply the signal level of the flicker, which is then presented to a meter so as to provide a numerical readable value of the flicker present.

10 Claims, 8 Drawing Figures

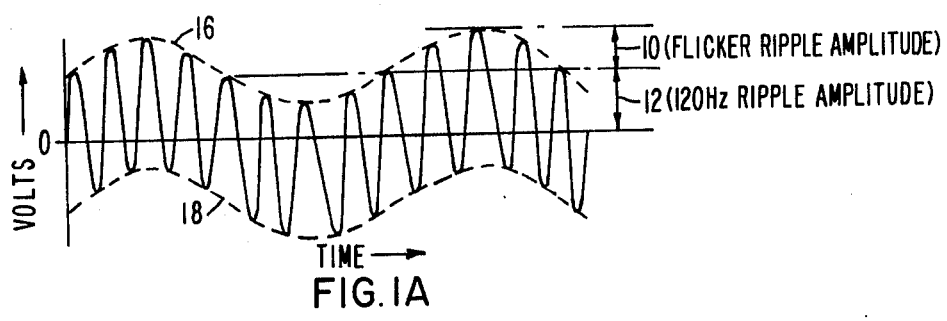
FIG.IA
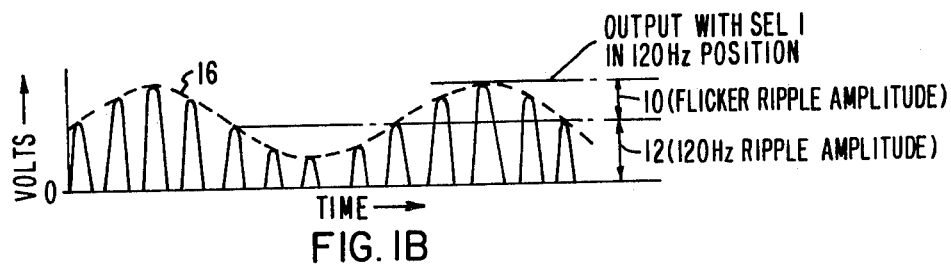
FIG.IB
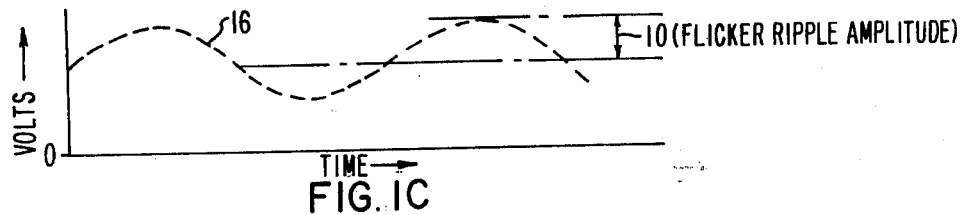
FIG.IC
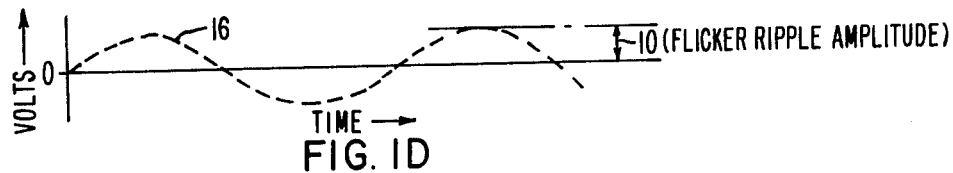
FIG.ID
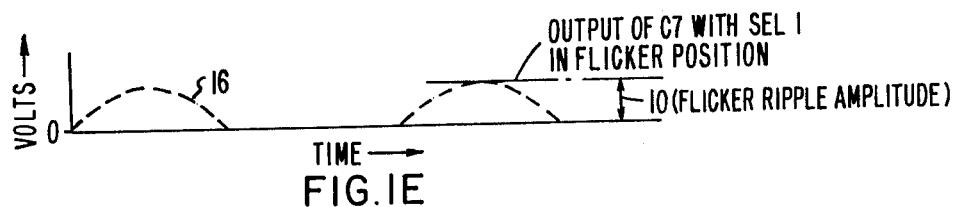
FIG.IE

ILLUMINATION FLICKER METER

BACKGROUND OF THE INVENTION

This invention relates, generally, to light measurement and, in particular, to a device for measuring flicker which may be present in an illumination source.

It is known that the human eye is sensitive to light flicker as low as one-half to one percent between 2 and 20 Hz. Large fluctuating electric loads, such as rolling mills and arc furnaces may create voltage disturbances which create such light flicker. Traditionally, methods such as synchronous capacitors or mechanically switched capacitor banks have been used to reduce these disturbances. These method suffer from the disadvantage that they are slow acting with respect to high frequency disturbances (20 Hz). With the advent of static VAR generators which are used for voltage regulation, fast disturbances may be minimized. However, the performance of static VAR generators in relation to light flicker is typically based on a percent regulation of line voltage. Since the relation between voltage and light output varies widely amongst differing light sources such as incandescent, mercury vapor, as well fluorescent lamps using different ballasts, the actual light flicker when based on percent regulation of line voltage is not readily identifiable. Traditional methods of measuring light do not allow the measurement of the actual flicker and generally do not appear on a meter since meters generally tend to damp out such small oscillations, thereby making the measurement of actual flicker inaccurate and inconsistent. One typical method of measuring lighting effectiveness may be found in U.S. Pat. No. 4,008,391, "Device For Measuring Lighting Effectiveness", issued Feb. 15, 1977 to Henderson, Jr., however even this only measures the quantity of light available.

It is desirable to have a device which measures as an identifiable quantity, the flicker present in illumination systems. It is also desirable that such a measurement exclude the average light output as well as any ripple which may be produced by the frequency of the power being supplied to the illumination system. Such a scheme is taught in the present invention.

Accordingly, the present invention relates to an illumination flicker measuring device, comprising a light sensor having an output for producing a first output signal related to the output of a measured light source, a first capacitor connected to receive the first output signal for removing the average value of the first output signal, thereby producing a second output signal, a first rectifier-amplifier device having an input connected to receive the second output signal for removing the lower envelope of the first output signal thereby producing a third output signal, a filter device having an input connected to receive the third output signal for removing that component of the first output signal ripple which is produced by the current supplied to the light source and producing a filtered output signal and a second capacitor connected to receive the filtered output signal of the filter for removing the direct current components of the first output signal thereby providing a signal which is related to the flicker produced by the light source.

BRIEF DESCRIPTION OF THE DRAWINGS

Reference is now made to the description of the preferred embodiment illustrated in the accompanying drawings, in which:

FIGS. 1A through 1E are a graphical representation of the processed lumens versus time measurement of FIG. 1 showing volts versus time;

DESCRIPTION OF THE PREFERRED EMBODIMENT

CONSTRUCTION OF THE ILLUMINATION FLICKER METER

Figure 1:
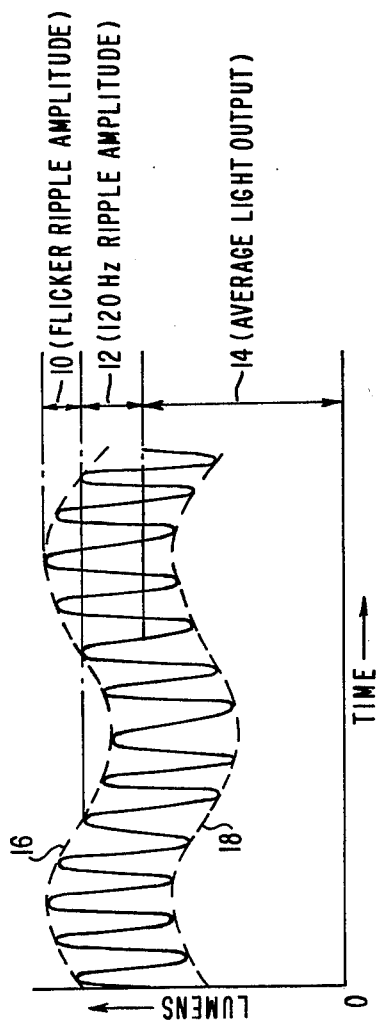
FIG. 1 is a graphical representation showing lumens versus time measurement.

Referring now to FIG. 1 the light output waveform from a typical flickering lamp is shown (note the flicker is slightly exaggerated for illustration purposes). The flicker ripple amplitude 10 forms that component of the total illumination measurement that comprises the amount of flicker present in the illumination system. The 120 Hz ripple amplitude 12 is representative of a typical 60 Hz alternating current source and would be 100 Hz and 800 Hz in a 50 Hz or 400 Hz system respectively. The average light output 14 is a reflection of the average lumens available. An upper envelope 16 and a lower envelope 18, although shown identical, vary according to the type of illumination present. For incandescent bulbs, the lower envelope 18 is of about the same shape as the upper envelope 16. However, for fluorescent lamps the lower envelope has less amplitude than the upper envelope 16.

Figure 2:
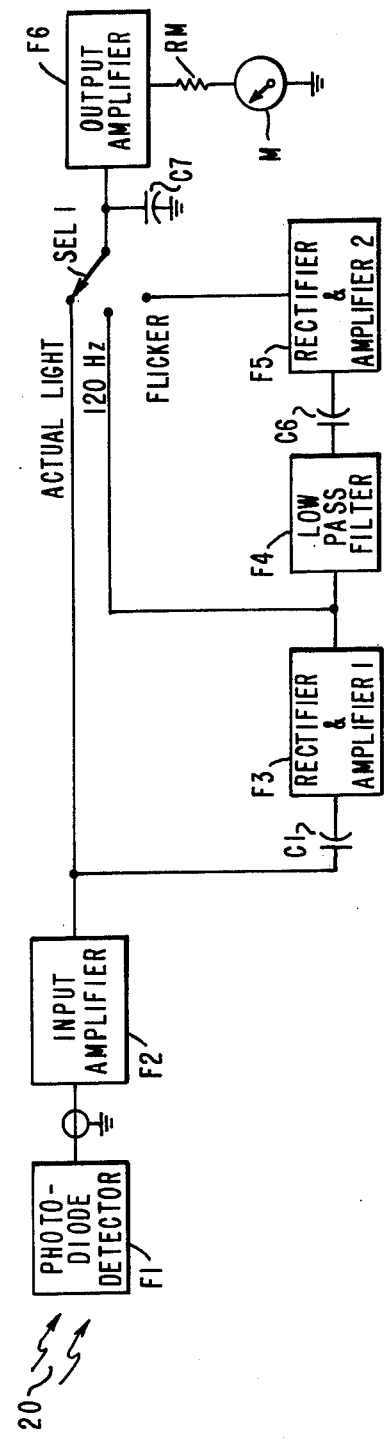
FIG. 2 is a block diagram showing the various components of the present invention.

Referring now to FIG. 2, there is shown a block diagram of the apparatus of the present invention. The illumination flicker meter comprises a photodiode detector function F1 which is capable of producing a voltage proportional to the light input 20. Since the output for low intensity lighting is generally on the order of millivolts, an input amplifier function F2 is utilized to produce a more readily usable signal. The output signal of the input amplifier function F2 at this point has a waveform containing all of the information shown in FIG. 1. The output of the input amplifier function F2 is then made available at selector switch SEL1 or through capacitor C1. The purpose of capacitor C1 is to remove the average light output component 14 (FIG. 1) portion of the signal available and produces the waveform shown in FIG. 1A. The signal then passes through rectifier and amplifier function F3 thereby removing the lower envelope 18 (FIG. 1) thereby producing the waveform shown in FIG. 1B. The output rectifier and amplifier function F3 then appears at the 120 Hz terminal of selector switch SEL1 and at the output of low pass filter function F4. The low pass filter function F4 then removes the 120 Hz ripple amplitude 12 (FIG. 1C) and a filtered signal is therefore presented to capacitor C6. Capacitor C6 removes the direct current components which may be present in the signal produced by the light 20 as well as components which arise due to noise and errors introduced by preceding circuitry (FIG. 1D). The rectifier and amplifier function F5 then peak detect the signal and presents only the flicker ripple amplitude 10 (FIG. 1E) to capacitor C7.

Capacitor C7 also charges up to this peak detected value providing a relatively stable signal (FIG. 1E) which is then presented to output amplifier function F6. Selector switch SEL1 is capable of being in either of three positions shown so that in the uppermost position (shown) the light output 14 (FIG. 1) or in the middle position the 120 Hz 12 (FIG. 1B) or the flicker ripple amplitude 10 (FIG. 1C) may be sampled.

With selector switch SEL1 in the actual light position, the voltage across capacitor C7 follows the output of the input amplifier function F2. However with the selector switch SEL1 in the 120 Hz or flicker position, capacitor C7 in conjunction with the associated rectifier and amplifiers 1 and 2 form a peak detector.

The amplifier function F6 amplifies the signal available so as to be usable with a meter reading device M. The output of the amplifier function F6 is then passed through resistor RM and presented to meter M thereby providing a visual output of that aspect of the light source 20 which is being measured.

Figure 3:
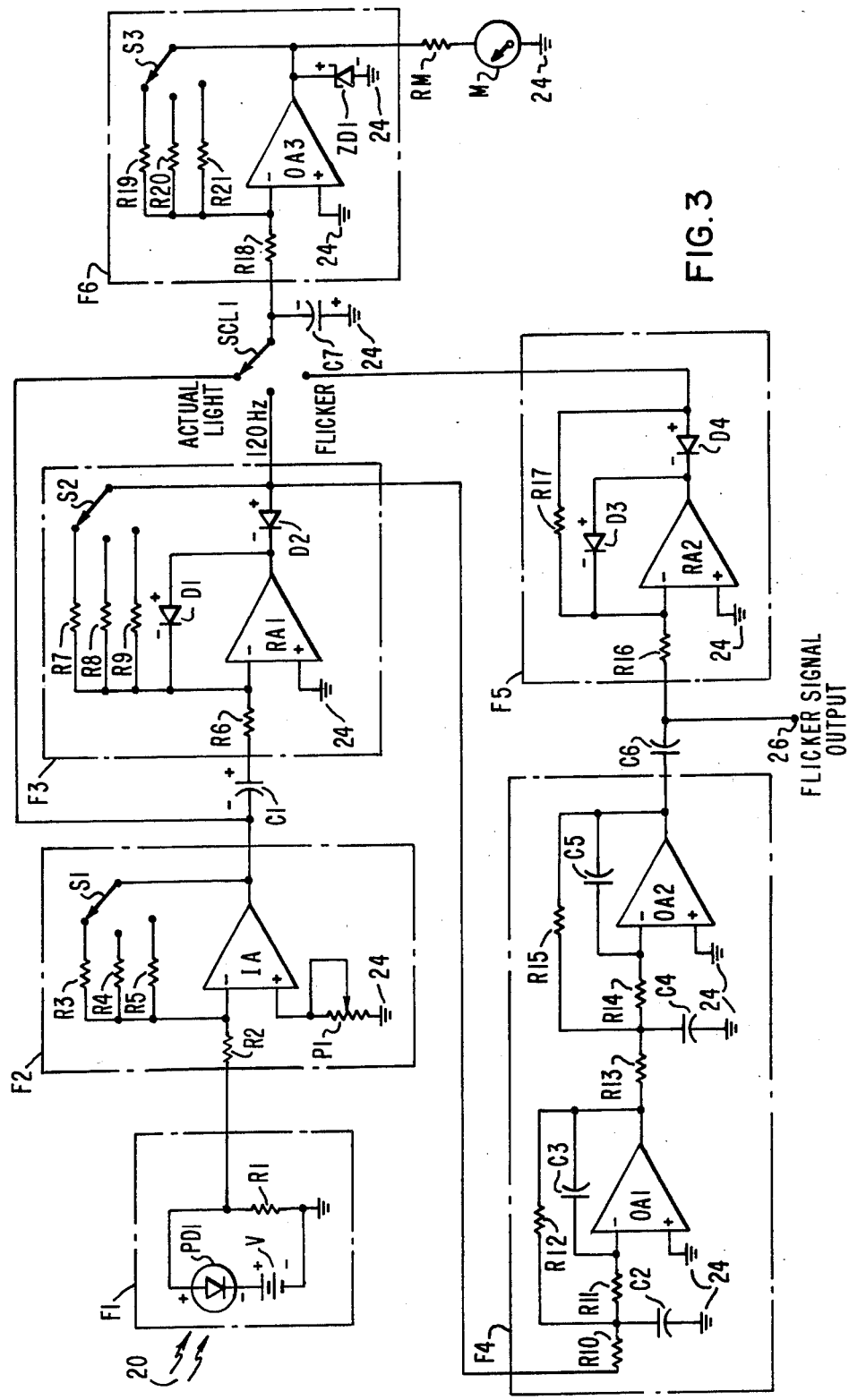
FIG. 3 is a schematic diagram of the components comprising the present invention.

Referring now to FIG. 3, there is shown a schematic diagram of the present invention. The photodiode detector function F1 is comprised of a voltage source V having the positive terminal connected to the cathode of photodiode PD1. The anode of photodiode PD1 is connected to one terminal of resistor R1 and R2 thereby entering function F2. The remaining terminal of resistor R1 is connected to the negative terminal of the voltage source V and to ground 24. The remaining terminal of resistor R2 is then connected to the negative terminal of the input amplifier IA as well as one terminal of resistors R3, R4 and R5. The positive signal input terminal of the input amplifier IA is connected to the arm of potentiometer P1 and to one terminal of potentiometer P1. The remaining terminal of potentiometer P1 is connected to ground 24. The remaining terminal of resistors R3, R4 and R5 and each connected to their own terminal of switch S1. The output of the input amplifier IA is then connected to the arm of switch S1, the light output terminal of selector switch SEL1 and to the negative terminal of capacitor C1. The positive terminal of capacitor C1 is connected to one terminal of resistor R6 thereby entering the rectifier and amplifier function F3. The remaining terminal of resistor R6 is connected to the negative signal input terminal of rectifier amplifier RA1 as well as to the cathode of diode D1 and one terminal of resistors R7, R8 an R9. The positive signal input terminal of rectifier amplifier RA1 is connected to ground 24. The remaining terminals of resistors R7, R8 and R9 are connected to contacts of switch S2 in a fashion identical to that of resistors R3, R4 and R5 to switch S1. The anode of diode D1 is then connected to the output of rectifier amplifier RA1 and to the cathode of diode D2. The anode of diode D2 is connected to the arm of switch S2, the 120 Hz terminal of selector switch SEL1 and to one terminal of resistor R10 thereby entering low pass filter function F4. The remaining terminal of resistor R10 is connected to one end of resistors R11 and R12 as well as to one terminal of capacitor C2. The remaining terminal of capacitor C2 is connected to ground 24. The remaining terminal of resistor R11 is connected to one terminal of capacitor C3 as well as to the negative single input of operational amplifier OA1. The positive signal input of operational amplifier OA1 is connected to ground 24. The output of operational amplifier OA1 is connected to the remaining terminals of resistor R12 and capacitor C3 as well as to one end of resistor R13. The remaining terminal of resistor R13 is connected to one terminal of resistors R14 and R15 as well as to one terminal of capacitor C4. The remaining terminal of resistor R14 is connected to one terminal of capacitor C5 as well as to the negative signal input terminal of operational amplifier OA2. The positive signal input terminal of operational amplifier OA2 as well as the remaining terminal of capacitor C4 are connected to ground 24. The output terminal of operational amplifier OA2 is connected to the remaining terminals of resistor R15 and capacitor C5 as well as to one terminal of capacitor C6. The remaining terminal of capacitor C6 is connected to the oscilloscope flicker signal output terminal 26 as well as one terminal of resistor R16 thereby entering the rectifier and amplifier block F5. The remaining terminal of resistor R16 is connected to the negative input signal terminal of rectifier amplifier RA2 as well as to one terminal of resistor R17 and the cathode of diode D3. The positive signal input terminal of rectifier amplifier RA2 is connected to ground 24. The output signal terminal of rectifier amplifier RA2 is connected to the anode of diode D3 as well as to the cathode of diode D4. The remaining terminal of resistor R17 is connected to the anode of diode D4 and then to the flicker terminal of selector switch SEL1. The arm of selector switch SEL1 being capable of switching between the light output, 120 Hz and flicker terminals is connected to the cathode of capacitor C7 as well as to one terminal of resistor R18 thereby entering the amplifier block F6. The anode of capacitor C7 is connected to ground 24. The remaining terminal of resistor R18 is connected to the negative signal input terminal of the output amplifier OA3 as well as to one terminal of resistors R19, R20 and R21. The positive signal input terminal of the output amplifier OA3 is connected to ground. The remaining terminals of resistors R19, R20 and R21 are connected to terminals of switch S3 in a fashion similar to that for switches S1 and S2. The output signal terminal of the output amplifier OA3 is connected to the arm of switch S3 as well as to one terminal of resistor RM and to the cathode of Zener diode ZD1. The remaining terminal of resistor RM is connected to one terminal of the meter M while the remaining terminal of the meter M as well as the anode of Zener diode ZD1 are connected to ground 24.

In the preferred embodiment of the present invention the input amplifier IA, rectifier amplifier RA1, operational amplifiers OA1 and OA2, rectifier amplifier RA2 as well as the output amplifier OA3 are general purpose amplifier readily available and in common usage by those skilled in the art and therefore the power supply connections are not shown.

OPERATION OF THE ILLUMINATION FLICKER METER

Referring now to FIGS. 2 and 3, the operation of the present invention is readily discernible. A light source 20 which may be the illumination produced by an incandescent, fluorescent, mercury vapor or any other type of illumination device, strikes the photodiode PD1 producing a current proportional to the light input. Resistor R1 produces a voltage across it which is proportional to the current. Since the output for low intensity lighting will be on the order of millivolts, an adjustable input amplifier IA is utilized to provide a more readily usable signal level. The gain of the input amplifier IA is adjustable by use of switch S1 where the gain is equivalent to the value of the feedback resistors R3, R4 or R5 divided by the value of the input resistor R2. It is to be understood that there may be more feedback resistors or less feedback resistors and that switch S1 may be a point of internal strapping or directly hardwired. The ouput signal produced by the input amplifier IA, is the waveform as seen in FIG. 1 and is made available for reading by use of selector switch SEL1. The output signal of the input amplifier IA also passes through capacitor C1. Capacitor C1 removes the average light value 14 (FIG. 1A) and is presented to rectifier and amplifier RA1 contained in F3. Rectifier and amplifier RA1 has an adjustable gain similar to that in the input amplifier IA and also has diodes D1, D2 so as to remove the lower envelope 18 (FIG. 1B). The output of rectifier-amplifier RA1 is presented to the 120 Hz terminal of selector switch SEL1 and contains the flicker ripple amplitude 10 as well as the 120 Hz ripple amplitude 12 shown in FIG. 1B. The output rectifier amplifier RA1 is also presented to the low pass filter function F4. The low pass filter function F4 is comprised of operational amplifiers OA1 and OA2 which together comprise a four pole low pass Butterworth filter. In the preferred embodiment of the present invention, this filter is designed so that $F_0 = 20$ Hz thereby removing the 120 Hz signal present in the light source (FIG. 1C). It is to be understood that in the preferred embodiment of the present invention, a 60 Hz alternating current supply is being used to power the light source. However, in the event that other alternating current sources having different frequencies are utilized, $F_0$ may be adjusted accordingly. The output of the low pass filter F4 now has the average light output component 14 removed, the 120 Hz ripple amplitude 12 as well as the lower envelope 18 of FIG. 1 and therefore presents the flicker ripple amplitude 10 (FIG. IC). The output of the low pass filter F4 then passes through capacitor C6 which removes the DC which may be in the signal due to, for example, noise introduced by any one of the amplifiers prior to the capacitor C6 as well as the DC component of the light 20 (FIG. 1D). An oscilloscope flicker signal output terminal 26 is provided so that an oscilloscope, strip chart recorder or similar device may be utilized so as to visually look at the actual signal or flicker. The output from capacitor C6 is then presented to rectifier and amplifier RA2, which is similar to rectifier and amplifier RA1, with the exception that the gain is not adjustable. The rectifier and amplifier RA2 of F5 further removes any ripple in the signal and amplifies the signal thereby providing a signal level which is equal to the flicker ripple amplitude 10 and presents the signal to the flicker terminal of selector switch SEL1 (FIG. IE).

Through the use of selector switch SEL1, the actual light, the 120 Hz or the flicker readings may be utilized. The signal present at one of the three terminals is then passed through the arm of selector switch SEL1 whereby capacitor C7 either follows the output of the input amplifier IA function F2 or forms part of a peak detector as described earlier. This now DC signal is then presented to the output amplifier OA3 contained in F6. Similar to the input amplifier as well as rectifier and amplifier RA1, the gain of the output amplifier OA3 is adjustable utilizing switch S3. The output signal of the output amplifier OA3 then passes through the resistor RM whose purpose is to produce a current which is then passed to the meter M and in the preferred embodiment of the present invention is an analog current measuring meter. Zener diode ZD1 is a protective device and is sized so that any excessive voltages which may hurt the meter M, are shunted to ground.

In the event that selector switch SEL1 is positioned so as to read flicker, the actual reading on the meter M will be the actual flicker of the light source 20 thereby providing a quantitative value for analysis purposes.

It is to be understood that many modifications to the present invention may be utilized without departing from the spirit and scope of the present invention. For example, different amplifiers may be used such as discrete components as opposed to the integrated circuits shown. Further, the use of the filter may have less or more poles than the four-pole filter shown. Additionally filters other than the Butterworth type may be utilized. Although the upper envelope 16 is utilized, the lower envelope 18 could be used simply by the addition of an inverting amplifier placed in the circuit and as an example, would be placed before rectifier and amplifier 1 of F3. Additionally, the removal of rectifier and amplifier 1 of F3 would average the upper and lower envelopes 16 and 18, thereby presenting a different flicker magnitude, if it is determined that this particular value is necessary. Further, a plurality of illumination flicker meters may be utilized to contemporaneously read the amount of illumination flicker present in different places, positions, conditions or arrangements.

Therefore, in addition to the above-enumerated advantages, the disclosed invention produces a relatively inexpensive illumination flicker meter system which is compact, readily movable, while providing objective quantative readings enabling it to be used with different illumination sources.

What I claim is:

1. An illumination measuring apparatus, comprising:
   light sensing means having an output, for producing a first output signal related to the output of a measured light source;
   first storage means connected to receive said first output signal for removing the average value of said first output signal thereby producing a second output signal at an output thereof;
   first unidirectional means having an input connected to receive said second output signal for removing the lower envelope of said first output signal thereby providing a third output signal at an output thereof;
   filter means having an input connected to receive said third output signal for removing that component of said first output signal ripple which is produced by standard frequency line current being supplied to said light source and producing a filter means output signal related to the remaining signal;
   second storage means connected to said output of said filter means for removing the direct current components of said first output signal and producing a second storage means output signal related thereto; and
   second unidirectional means connected to the output of said second storage means for thereby providing an output signal which is related to the flicker produced by said light source.

2. A device according to claim 1 wherein said light sensing means is comprised of a photodiode detector.

3. A device according to claim 1 wherein said first storage means and said second storage means are capacitor means.

4. A device according to claim 1 wherein said first unidirectional means and said second unidirectional means are unidirectional amplifiers.

5. A device according to claim 1 wherein said filter means is a low pass filter.

6. A device according to claim 5 wherein said low pass filter is a four pole Butterworth filter.

7. A device according to claim 4 wherein said first and said second unidirectional amplifier means are comprised of a diode in circuit relationship with an amplifier.

8. An illumination measuring device, comprising:
photodiode detector means having an output, for providing a first output signal related to the output of a measured light source;
first capacitor means connected to receive said first output signal for removing the average value of said first output signal thereby producing a second output signal at an output thereof;
first rectifier amplifier means having an input connected to receive said second output signal for removing the lower envelope of said first output signal thereby providing a third output signal at an output thereof;
low pass filter means having an input connected to receive said third output signal for removing that component of said first output signal ripple which is produced by standard frequency line current being supplied to said light source and producing a filter means output signal related to the remaining signal;
second capacitor means connected to said output of said low pass filter means for removing the direct current components of said first output signal and producing a second capacitor means output signal related thereto; and
second rectifier amplifier means connected to the output of said second capacitor means for thereby providing an output signal which is related to the flicker which is produced by said light source.

9. An illumination measuring apparatus, comprising:
light sensing means having an output, for producing a first output signal related to the output of a measured light source;
first storage means connected to receive said first output signal for removing the average value of said first output signal thereby producing a second output signal at an output thereof;
first unidirectional means having an input connected to receive said second output signal for removing the lower envelope of said first output signal thereby providing a third output signal at an output thereof;
filter means having an input connected to receive said third output signal for removing that component of said first output signal ripple which is produced by standard frequency line current being supplied to said light source and producing a filter means output signal related to the remaining signal;
second storage means connected to said output of said filter means for removing the direct current components of said first output signal and producing a second storage means output signal related thereto which is related to the flicker produced by said light source.

10. An illumination measuring device, comprising:
photodiode detector means having an output, for providing a first output signal related to the output of a measured light source;
first capacitor means connected to receive said first output signal for removing the average value of said first output signal thereby producing a second output signal at an output thereof;
first rectifier amplifier means having an input connected to receive said second output signal for removing the lower envelope of said first output signal thereby providing a third output signal at an output thereof;
low pass filter means having an input connected to receive said third output signal for removing that component of said first output signal ripple which is produced by standard frequency line current being supplied to said light source and producing a filter means output signal related to the remaining signal;
second capacitor means connected to said output of said low pass filter means for removing the direct current components of said first output signal and producing a second capacitor means output signal related thereto which is related to the flicker which is produced by said light source.

* * * * *